UNITED STATES PATENT OFFICE.

OTTO N. WITT, OF MÜLHAUSEN, (ALSACE,) GERMANY, ASSIGNOR TO LEOPOLD CASSELLA & CO., OF FRANKFORT-ON-THE-MAIN, GERMANY.

COLORING-MATTER.

SPECIFICATION forming part of Letters Patent No. 248,246, dated October 11, 1881.

Application filed December 20, 1880. (Specimens.) Patented in France November 18, 1880.

*To all whom it may concern:*

Be it known that I, OTTO N. WITT, Ph. D., of Mülhausen, (Alsace,) Germany, have invented a new and useful Improvement in the Process for the Production of Coloring-Matters Suitable for Dyeing and Calico-Printing, of which the following is a specification.

The object of the invention is to furnish a coloring-matter which, being of the same shade and fastness as madder-violet, is at the same time cheaper, easier of application, and which may be readily combined with many other artificial dyes.

To produce this coloring-matter I proceed in the following manner: I place in a wooden vat one hundred and eighty-six pounds of nitrosodimethylaniline hydrochloride. I then add a solution of one hundred and eight pounds of metaphenylenediamine in two hundred and sixteen gallons of water. I take care to obtain a perfect solution by vigorous stirring, and when this is the case I allow the liquid to remain undisturbed during several hours. I then introduce a steam-jet and gradually raise the temperature of the liquid to the boiling-point. At this stage of the operation I now introduce gradually one hundred and sixteen pounds of ordinary aqueous hydrochloric acid or a corresponding quantity of any other acid. I may, but this is not absolutely necessary, facilitate and quicken the reaction by the injection of cold or hot air or by adding an oxidizing agent, such as, for instance, ferric chloride. When the color of the solution ceases to increase in intensity I allow the liquid to cool and then precipitate the dye-stuff, which it now contains, by the addition of a salt, such as sodic chloride or acetate, zincic chloride, or even by soda. In the latter case the precipitate, after filtering and before drying, must be mixed with so much hydrochloric acid as is necessary to allow, after drying, of a ready solution in hot water. The exact quantity of acid necessary for this purpose must be ascertained each time by a previous test.

Instead of working in an aqueous solution, I may induce the reaction of the above-named reagents by mere fusion, with or without the addition of oxidizing reagents, such as ferric chloride, potassic bicromate, or any other; nor do I limit myself to the exact proportions and solvents indicated, as they may be varied without departing from the principle of my invention.

The dye thus obtained gives dark-violet shades on cotton, wool, and silk, and these shades may be varied by the admixture of other artificial dyes.

What I claim as new is—

A violet-dye formed by the action of nitrosodimethylaniline on metaphenylenediamine, substantially as described.

In testimony whereof I have signed my name to this specification in the presence of two subscribing witnesses.

OTTO N. WITT.

Witnesses:
 T. PICCARD-HOLSENHOFF,
 F. KRAFFT-AIGROZ.